(No Model.)  J. WINNEN & A. HEUSCH.  6 Sheets—Sheet 2.
MACHINE FOR CUTTING MEAT.

No. 289,051.  Patented Nov. 27, 1883.

(No Model.)  
J. WINNEN & A. HEUSCH.  
MACHINE FOR CUTTING MEAT.

No. 289,051. Patented Nov. 27, 1883.

Witnesses.  
Will R. Omohundro.  
Louis Nolting.

Inventors  
Jacob Winnen  
Anton Heusch  
By Wm H Lotz  
Atty.

(No Model.)

6 Sheets—Sheet 6.

J. WINNEN & A. HEUSCH.
MACHINE FOR CUTTING MEAT.

No. 289,051.  Patented Nov. 27, 1883.

WITNESSES:
Adam Geo. White
Louis Nolting

INVENTOR
Jacob Winnen
Anton Heusch
BY Wm H Lotz
ATTORNEY

UNITED STATES PATENT OFFICE.

JACOB WINNEN AND ANTON HEUSCH, OF CHICAGO, ILLINOIS.

MACHINE FOR CUTTING MEAT.

SPECIFICATION forming part of Letters Patent No. 289,051, dated November 27, 1883.

Application filed February 2, 1883. (No model.)

*To all whom it may concern:*

Be it known that we, JACOB WINNEN and ANTON HEUSCH, of Chicago, in the county of Cook and State of Illinois, have invented certain new and useful Improvements in Meat-Chopping Machines; and we do hereby declare that the following is a full, clear, and exact description thereof, reference being had to the accompanying drawings, and to the letters of reference marked thereon, which form a part of this specification.

The nature of our invention relates to machines for cutting and mincing meat for sausage; and it consists of the novel devices and combinations of devices hereinafter described and specifically claimed.

Figure 1:
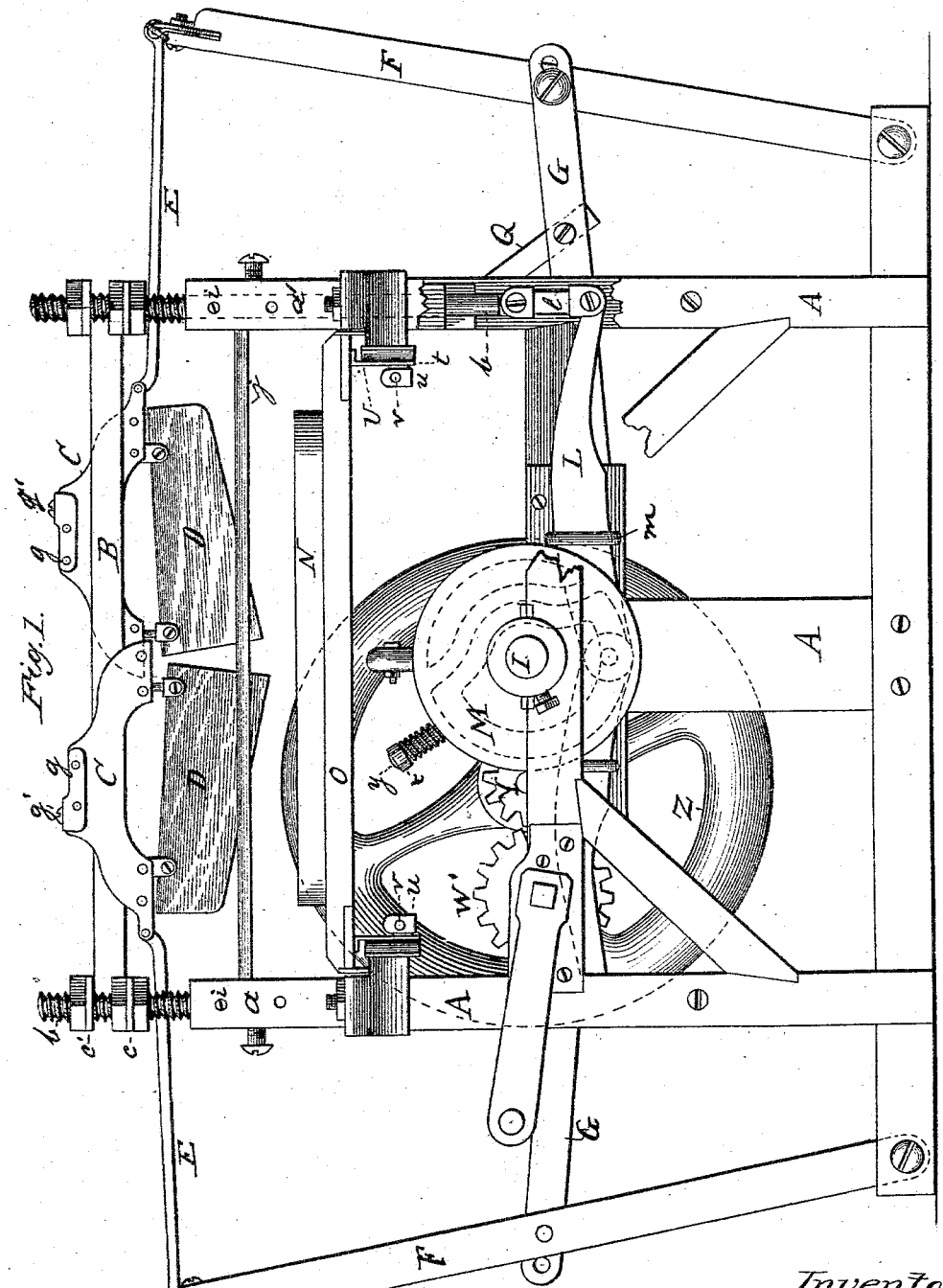
Figure 2:
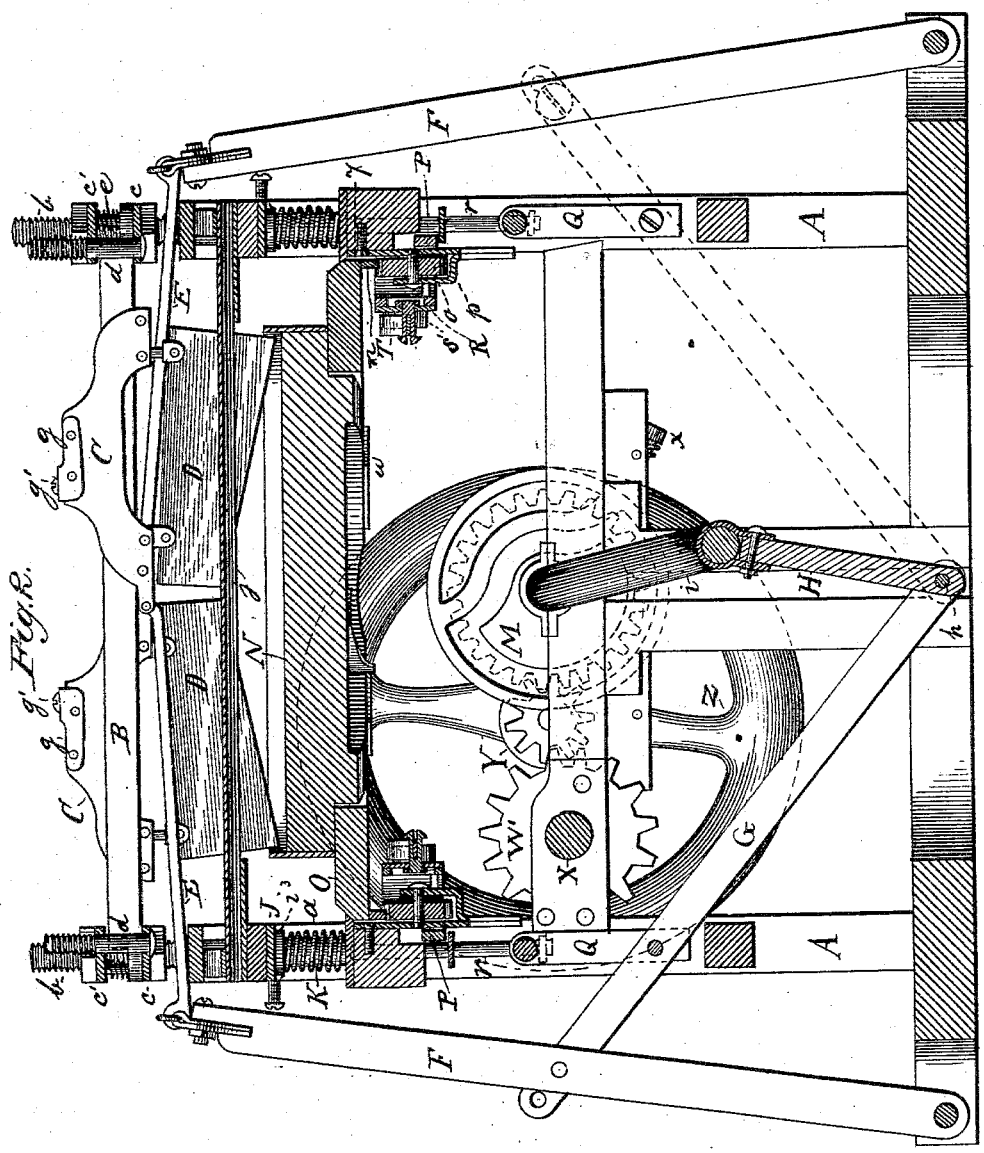
Figure 3:
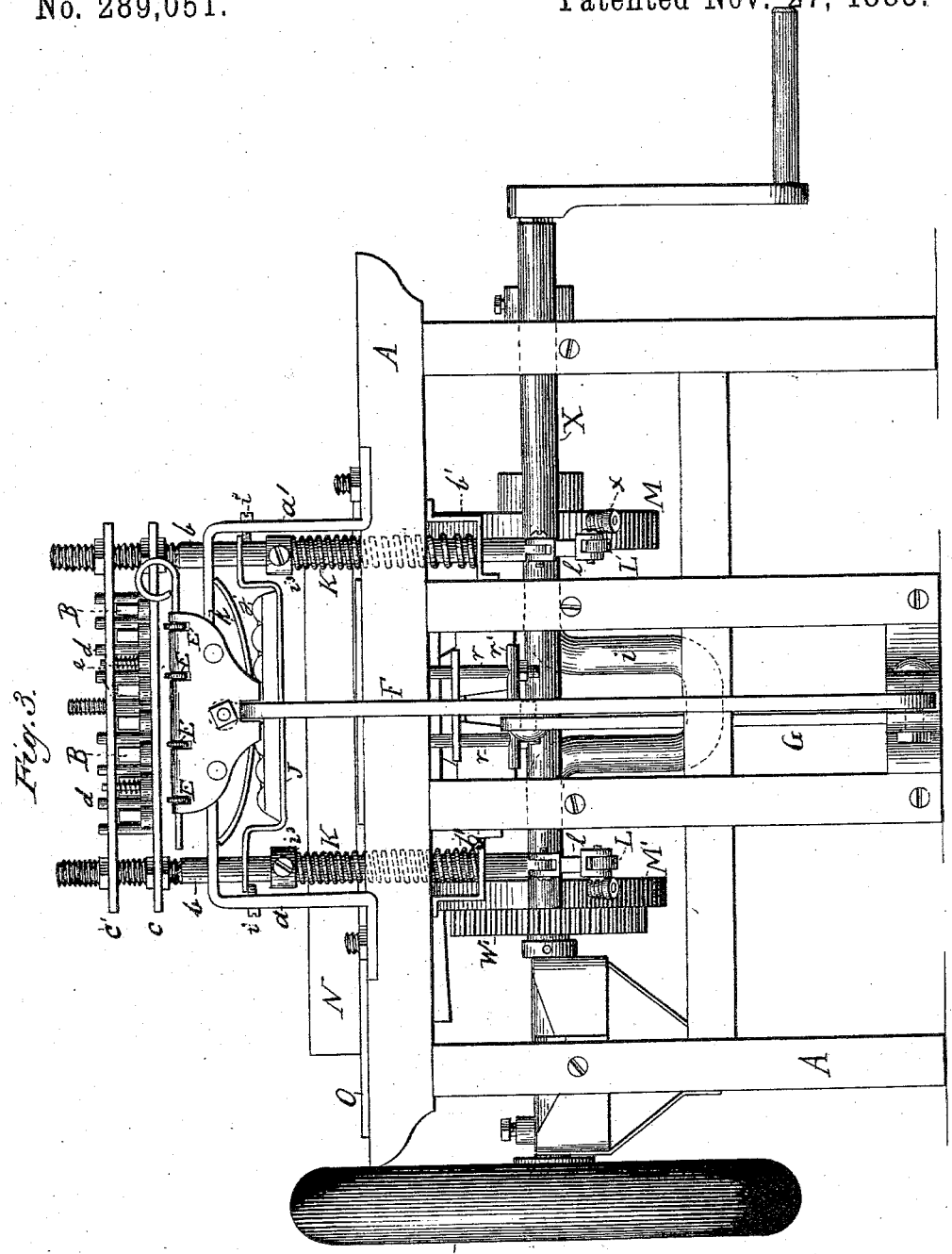
Figure 4:
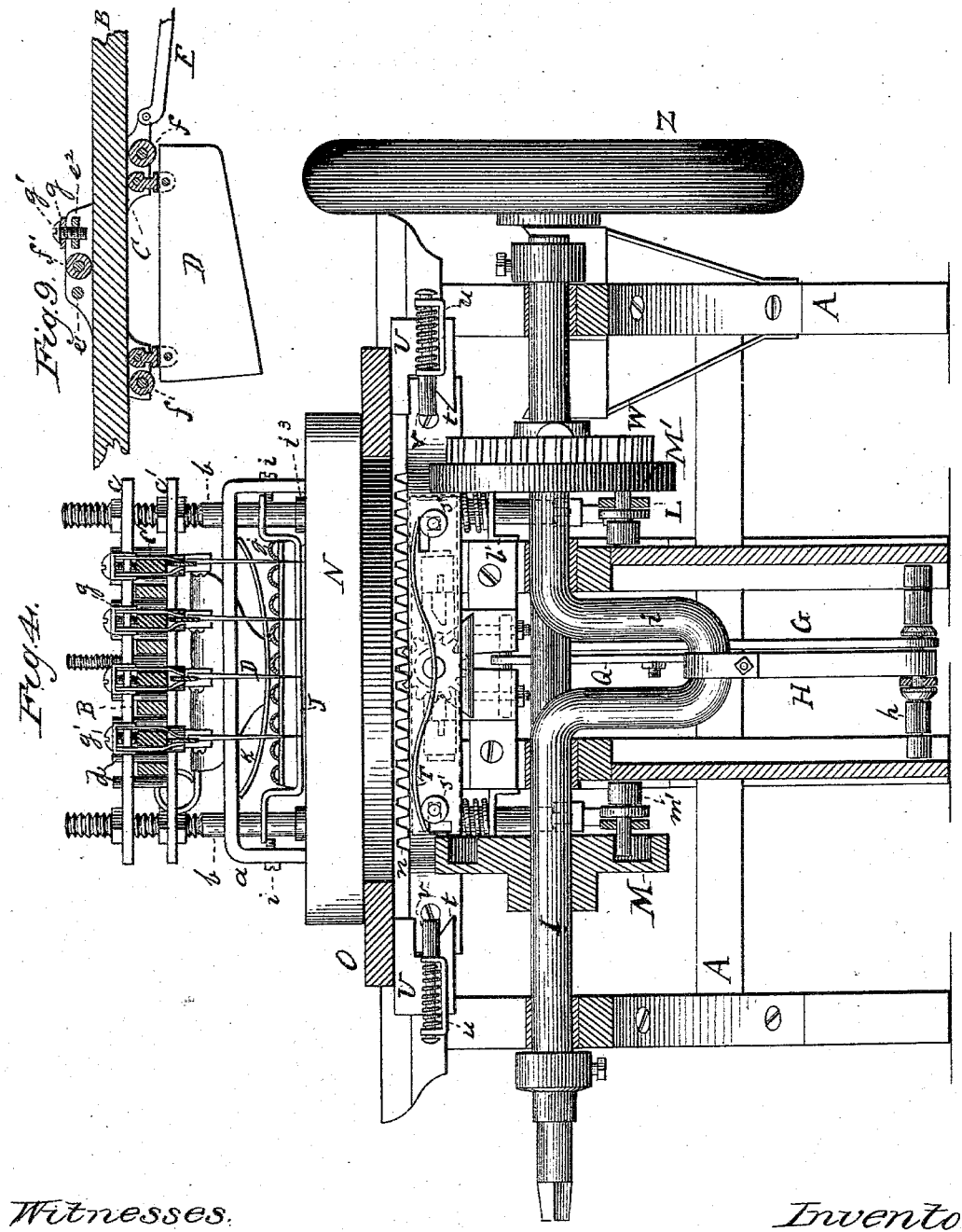
Figure 5:
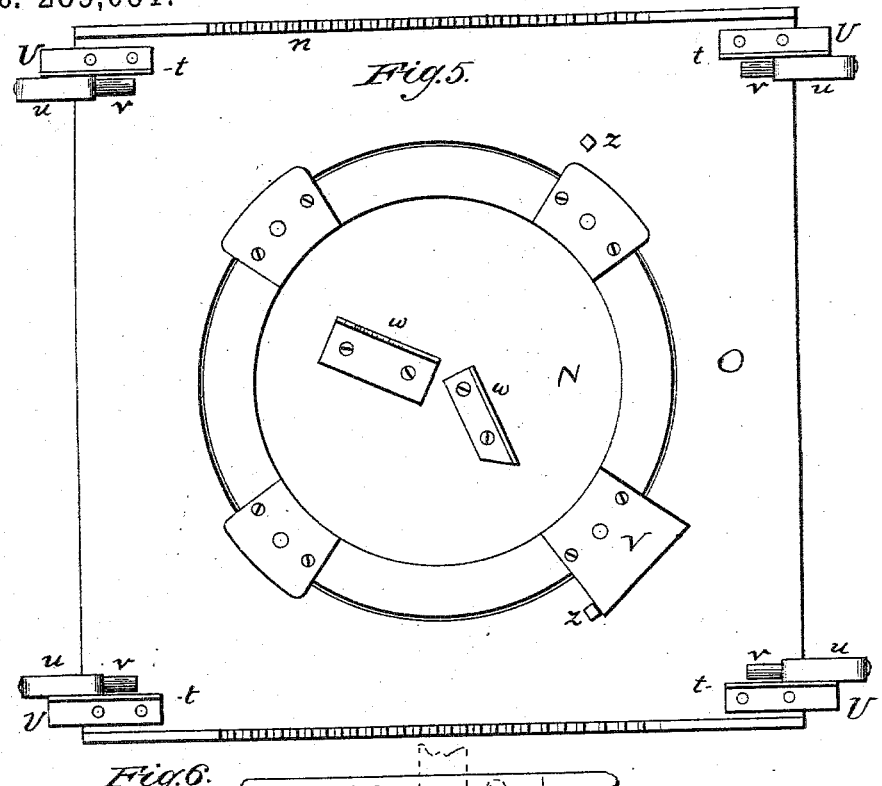
Figure 6:
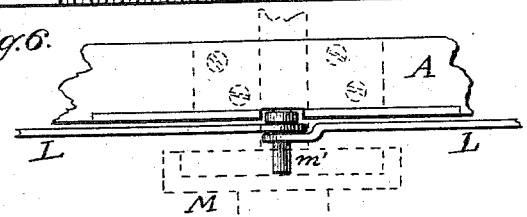
Figure 7:
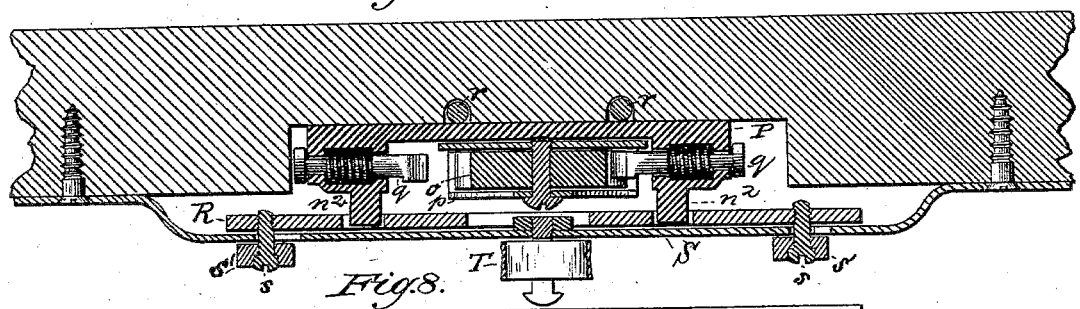
Figure 8:
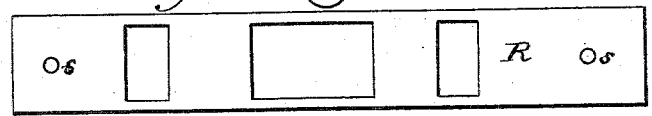
Figure 10:
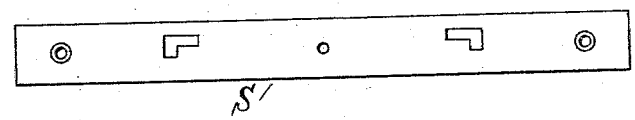
Figure 11:
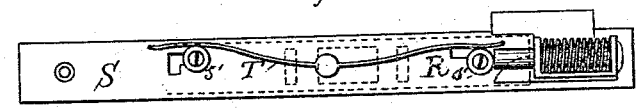
Figure 12:
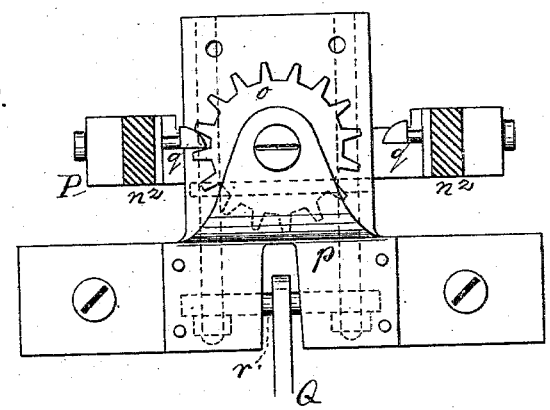
Figure 13:
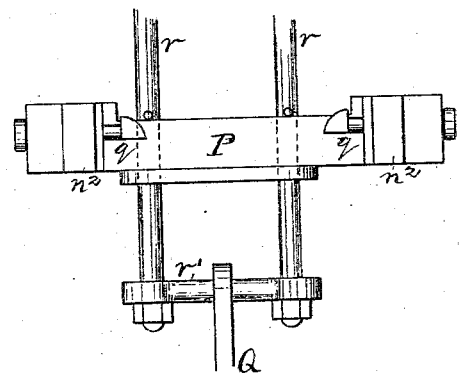

In the accompanying drawings, Figure 1 represents a side elevation of the machine; Fig. 2, a longitudinal vertical section of the same; Fig. 3, an end elevation of the machine; Fig. 4, a vertical cross-section through its center; Fig. 5, a bottom view of the table; Fig. 6, a detailed view of the cam and lever connection; Fig. 7, a sectional plan on the line 7 of Fig. 2 of the mechanism for reversibly moving the table; Fig. 8, an elevation of the pawl-shifting plate, and Fig. 9 a sectional elevation of one of the knife guides and carriages; Fig. 10, an elevation of plate S, having L-shaped slots; Fig. 11, an elevation of plates S and R as connected; Fig. 12, an elevation of the rigid pinion-bracket $p$, of pinion $o$, and of plate P, that carries pawls $q$; and Fig. 13, an elevation of rods $r$, that impart a vertical reciprocating motion to plate P.

Corresponding letters in the several figures of the drawings designate like parts.

A denotes the main frame, composed of uprights, and longitudinal and cross beams in suitable positions for the several rigid parts of the machine to be secured thereto, and $a\ a'$ denote two yoke-frames secured centrally upon the end beams of the main frame. Two rods, $b$, are passed through holes near the ends of each yoke-frame $a\ a'$, and also through holes in the end beams of main frame A, and again through holes in angle-braces $b'$ of such frame, to be vertically guided therein. On their upper ends these rods $b$ are screw-threaded, for adjustably securing between screw-nuts cross-plates $c$ and $c'$, the lower ones of which are provided with spacing-studs $d$. Between these cross-plates $c$ and $c'$, at each end of the machine, are clamped the ends of longitudinal guide-bars B, that are set on edge between the spacing-studs $d$. These bars B may be provided at each end with a flattened eye for securing a stud passing through a hole in plate $c'$, and surrounded by a spiral spring, $e$, bearing with its ends upon the eye of bar B and under cross-plate $c'$, and assisting to elastically hold such guide-bars B down upon cross-bar $c$.

C C are a series of carriages, each composed of two side plates, connected at the bottom by studs that form the pivots for rollers $f$, and above by a stud, $e'$, and a plate, $e^2$, the former forming the pivotal connection for a clasp-shaped cap, $g$, that carries a roller, $f'$, and is adjustably secured by a screw, $g'$, which is passed through a hole in cap $g$ and is tapped into plate $e^2$. Such a carriage C is placed upon each bar B, with its rollers $f$ bearing against the under side of such bar and the roller $f'$ riding on top of the same, and to the bottom of each carriage C is removably secured, by suitable eyed and slitted connecting-pieces, a knife, D, that has an inclined cutting-edge. The ends of the carriages C, at the narrow sides of the knives, are pivotally connected by bars or rods E with the upper transversely-expanded ends of levers F, the lower ends of which are pivoted in or to the base of main frame A. As will be noticed, the knives D being secured alternately opposite to the carriages C, these carriages are alternately coupled to the levers F of opposite ends of the machine, in a manner that with swinging either lever F the alternate knives will move with it. At about its center each bar F has pivotally coupled the end of a connecting-bar, G, and the opposite ends of these bars G are both coupled to a cross-head, $h$, which has rollers at its ends that move in and are guided between vertical grooves of the main frame A. This cross-head $h$, by a pitman, H, is coupled with crank $i$ of main shaft I in such a manner as that by turning such shaft I the cross-head $h$ will be vertically raised and lowered, whereby the connecting-bars G will swing the levers F simultaneously to and fro, to approach and then recede from each other, thus causing the knives D in alternate order to move past each other in opposite directions. The cutting-edges of knives D are guided between longitudinal bars $j$, that are semicircular in section, and are rigidly connected together at their ends, where they are supported on saddle-bars J. These bars have holes in their ends to be guided on vertical rods $b$, and are supported on the ends of screws $i'$, tapped through the sides of yoke-frames $a$ $a'$. These guide-bars $j$ are pressed downward upon the saddle-bars J by semi-elliptic springs K. Any meat sticking to the knives will be scraped off by the edges of bars $j$ with each vertical movement of such knives, and the saddle-bars J can yield vertically by depressing springs K. Each vertical rod $b$ has an adjustable collar, $i^3$, which rests upon a spiral spring, K, that surrounds such rod $b$, and the spring is supported on the angle-brace $b'$, for counterbalancing such rods $b$ and their connections. Such collars $i^3$, with each upstroke of rods $b$, will strike under the saddle-bars J, and will raise them and the scraper-bars $j$ a short distance to provide sufficient space for placing under or removing the meat. To the lower end of each vertical rod $b$ is pivotally connected a short link, $l$, which links again are pivotally coupled to the exterior ends of levers L, that are passed through staples $m$, which are rigidly attached to the longitudinal beams of the main frame A. These levers L have a sliding and swinging movement in the staples $m$, and the inward ends of both levers L, at each side of the machine, are pivotally connected by a pin, $m'$, one end of which enters a vertical guide-groove of the main frame, and the other end the cam-groove of wheel M or M', mounted upon the crank-shaft I. The cam-grooves in wheels M and M' are designed to bring about an intermittent vertical up-and-down movement of the inward end of levers L, that again will transmit such movements to rods $b$ and to the knife-guides B, supported thereon. The vertical movements of the knives D are thus adjusted to take place only after such knives have arrived at the end of each stroke, in such a manner that the forward stroke of the knives for cutting through the meat takes place while the coupling-pins $m'$ are on their uppermost position, and are guided in the radially-smaller concentric segment of the cam-groove in wheels M and M'. After such stroke of the knives is completed, the pin $m'$ will be pushed downward by the eccentric portion of the cam-groove, causing the levers L to lift the knives, which now, while the pin $m'$ is guided in the radially-larger concentric segment of the cam-groove, will make their return-stroke, and after arriving at the end of the same, the eccentric portion of the cam-groove in wheels M M' will push the pins $m'$ upward again, and thus will lower the knives to their former position, ready for the forward or cutting stroke again. In this manner the intermittent vertical movements of the knives are made alternate to the reciprocating movements of the same.

N is the cutting-table, that is square, with an upwardly-extending rim or flange to its edges, and has a circular bottom extension, which is fitted into a corresponding opening of the table O, so as to turn therein, and is secured against lifting off such table O by bottom cleats or flanges. The table O is guided between the end beams of main frame A, to slide transversely on such frame. Under each side of table O are secured rack-bars $n$, the teeth of which engage with pinions $o$, that are pivoted in brackets $p$, secured against the notched inward faces of the end beams of frame A. Plates P have end and guide hubs for holding the shanks of pawls $q$, which can slide therein longitudinally, and are pushed in the direction toward each other by spiral springs that surround such pawl-shanks. These plates P are placed against the notched faces of the end beams of main frame A, behind the brackets $p$, in such manner as to have a free vertical and horizontal sliding movement thereon. Each plate P horizontally slides on and vertically moves with a cross-bar that is rigid, with rods $r$, that are vertically guided in holes in end beams of frame A, and are connected by a cross-rod, $r'$, that forms the pivot for the end of a link, Q, the other end of which is pivotally coupled to connecting-bar G. By this device the plate P is vertically reciprocated with each revolution of the main shaft I. Each plate P has also two projecting lugs, $n^2$, which engage with vertical slots of a bar, R, that is placed behind a rigid plate, S, and is connected thereto by screws $s$, which are passed through ⌐-shaped slots of such plate S, and are tapped into bar R; and upon the head end of screws $s$, exteriorly of plate S, are pivoted small wheels $s'$. The ⌐-shaped slots of plate S are arranged such distance apart that while the shank of one screw $s$ has the position in the vertical portion of one ⌐-shaped slot the shank of the other screw $s$ has the position in the horizontal portion of the opposite ⌐-shaped slot of plate S, and that the pawl $q$ on the side of plate P that is opposite to the screw engaged in the vertical portion of the ⌐-shaped slot in plate S engages with the teeth of pinion $o$. Such pawls $q$ having sawtooth-shaped ends, and being pushed to engage with the pinions $o$ by spiral springs, they will intermittingly rotate the pinion with each down movement of plate P, such rotation being in one direction or another, as the plate R may be shifted for either screw $s$ to be locked in the vertical portion of its ⌐-shaped slot in plate S, and thereby one or the other of the opposite pawls $q$ is engaged with pinion $o$. A semi-elliptic spring, T, is secured against the center of plate S, the ends of which spring press upon wheels $s'$ and prevent either screw $s$ from lifting out of the vertical portion of the ⌐-shaped slots of plate S, in which it has been locked. Under the ends of each side of sliding table O is secured an angle-plate, U, that has an inwardlyprojecting and upwardly-inclined point $t$, and against the inward side of each angle-plate U is secured a guide-bracket, $u$, for a bolt, $v$, that is pushed inward by a spiral spring surrounding such bolt. After the table O has been intermittingly moved by pinions $o$ in either direction to the intended limit, the bolts $v$ will strike against the rollers $s'$, and will be pushed back to compress their surrounding springs, and at the same time the wedge-shaped points $t$ of angle-plates U will catch under the rollers $s'$ and will push such rollers upward, thereby depressing the spring T until such rollers have been raised to lift their pivot-screws $s$ out of the vertical portion into the horizontal portion of the ⌐-shaped slots in one end of plates S, when at once the bolts $v$, by the force of their compressed springs, will push the sliding bars R toward the direction in which now the sliding table O is to begin to move until the screws $s$ of the opposite ends of bars R enter the vertical portion of the ⌐-shaped slots in plates S, into which they will be pushed by the force of springs T. By thus shifting plates R the plates P are moved also to disengage the pawls $q$ of one end of the plates from all contact with pinions $o$, and to move the pawls $q$ of the opposite ends of plates P to engage with the teeth of such pinions $o$, that will now be rotated in opposite direction. Against the under side of cutting-table N are secured angle-plates $w$ at proper angular position, and to the rim of each cam-wheel M M' is secured a radially-projecting stud, $y$, that carries a roller, $x$, pushed outward by a spiral spring surrounding such stud $y$. At the point where the sliding movement of table O is reversed by plate U and spring-bolt $v$, and during the period when the knives D are on their elevated position, the roller $x$ of one wheel, M or M', will catch behind the face end of one of the plates $w$, and will rotate the table N a quarter-revolution before such roller $x$ will be clear again of such plate $w$, the rotation of such table being in opposite directions while at opposite ends of the machine. A plate, V, is secured to the bottom of table N, that radially projects beyond the edge of the circular bearing of the same, and limits the rotating movement of such table N to exactly one-quarter of a revolution by coming in contact with pins or stops $z$, that project from under table O. Upon shaft I is mounted a spur-wheel, W, into which meshes a pinion, Y, mounted on a short shaft that carries on its overhanging end a fly-wheel, Z, and into this pinion Y meshes again a spur-wheel, W', mounted upon a shaft, X, which, upon its opposite overhanging end, carries either a hand-crank or a pulley for driving the machine. The fly-wheels Z thus being rotated at faster speed, it will overcome the momentum of the operating parts, and will regulate the speed of motion in the machine.

The *modus operandi* of the machine is as follows, to wit: The meat to be cut being placed upon table N while the knives are in their elevated position, the machine is started to run, when, by the action of cam-wheel M M' and levers L, the knives will be lowered so that their rear cutting-edges will be in contact or close proximity with the surface of the table, and by the motion of crank I the levers F will now swing outward, and will pull the knives in alternate order over such table in opposite directions, so as to cut the meat in slices. Next, for their return-stroke, the knives are raised clear above the meat again, whereby any small pieces of meat sticking thereto will be scraped off by the bars $j$. With each revolution of the crank-shaft the pinions $o$ are rotated the pitch of one tooth by the pawls $q$, whereby the table is moved laterally the corresponding distance for each reciprocation of the knives until such table has reached the end of its track, when, by the action of plates U and spring-bolts $v$, the pawl-plate P is shifted, in order to move the table in opposite direction again, and at the same time while the feed for the sliding motion for the table is being reversed, the roller $x$ of stud $y$ on one of the cam-wheels M M' catches behind the angle-plate $w$ of table N and turns such table one-quarter of a revolution, whereby the cutting of the knives will now be at a right angle to the former cut, and in this manner the machine will continue to cut the meat until it has been reduced to the proper degree of fineness. By means of the nuts on vertical rods $b$ the knives can be adjusted with great accuracy just to touch the tables when in their lower position, so that such table N can be made of metal, glass, or marble, instead of wood, in which case the meat cut thereon will retain its natural flavor, which is not the case where meat is cut on a wooden block. By the set-screws $g'$ each knife-carriage C can be adjusted to take up all lost motion and to travel steadily and smoothly on its guide-bar B.

What we claim is—

1. In a meat-cutting machine, the combination of the knives D, reciprocating carriages C, guide-bars B, adjustably secured to rods $b$, links $l$, levers L, swinging in staples $m$, pins $m'$, and wheels M M', substantially as and for the purpose set forth.

2. In a meat-cutting machine, the combination of knives D, reciprocating carriages C, guide-bars B, adjustably secured between cross-plates $c$ and $c'$ to rods $b$, having counterbalancing-springs K, and means for intermittingly operating the same, substantially as and for the purpose set forth.

3. In a meat-cutting machine, the combination of knives B, means, substantially as described, for imparting thereto an alternate vertical and horizontal movement, the stationary longitudinal semicircular scraper-bars $j$, saddle-bars J, and springs K, substantially as set forth.

4. In a meat-cutting machine, the combination of the tables N and O, cam-wheels M M', levers L, cutters D, crank $i$, levers F, connecting-bars G, pitman H, plates U, spring-bolts $v$, pawl-plate P, pinions $o$, and pawl $q$, substantially as and for the purpose set forth.

5. In a meat-cutting machine, the combination, with the sliding table O, having rack-bars $n$, plates U, with inclined points $t$, and spring-bolts $v$, of fixed brackets $p$, with pinions $o$, vertically-reciprocated and longitudinally-movable bars P, with spring-pawls $q$ and lugs $n^2$, and fixed plates S, having springs T, and ⌐-shaped slots for screws $s$ of bars R, that carry wheels $s'$, all constructed and arranged to operate substantially as described and shown.

6. In a meat-cutting machine, in combination with table N, pivotally secured upon sliding table O, and having angular plates $w$, of wheels M, having studs $y$, with rollers $x$, the same being constructed and arranged to operate substantially as and for the purpose set forth.

In testimony that we claim the foregoing as our invention we affix our signatures in presence of two witnesses.

JACOB WINNEN.
ANTON HEUSCH.

Witnesses:
LOUIS NOLTING,
R. G. SCHMID.